(12) United States Patent
Tay et al.

(10) Patent No.: US 12,511,521 B2
(45) Date of Patent: Dec. 30, 2025

(54) MACHINE-LEARNED ATTENTION MODELS FEATURING ECHO-ATTENTION LAYERS

(71) Applicant: Google LLC, Mountain View, CA (US)

(72) Inventors: Yi Tay, Singapore (SG); Donald Arthur Metzler, Jr., Sunnyvale, CA (US); Dara Bahri, Lafayette, CA (US); Mostafa Dehghani, Amsterdam (NL)

(73) Assignee: GOOGLE LLC, Mountain View, CA (US)

( * ) Notice: Subject to any disclaimer, the term of this patent is extended or adjusted under 35 U.S.C. 154(b) by 1003 days.

(21) Appl. No.: 17/592,174

(22) Filed: Feb. 3, 2022

(65) Prior Publication Data

US 2022/0245432 A1 Aug. 4, 2022

Related U.S. Application Data

(60) Provisional application No. 63/145,935, filed on Feb. 4, 2021.

(51) Int. Cl.
*G06N 3/048* (2023.01)
*G06F 40/20* (2020.01)

(52) U.S. Cl.
CPC ............. *G06N 3/048* (2023.01); *G06F 40/20* (2020.01)

(58) Field of Classification Search
CPC ............................... G06F 40/20; G06N 3/0481
See application file for complete search history.

(56) References Cited

U.S. PATENT DOCUMENTS

| | | | |
|---|---|---|---|
| 2019/0205761 A1* | 7/2019 | Wu | G06F 16/353 |
| 2019/0377955 A1* | 12/2019 | Swaminathan | H04N 21/23418 |
| 2021/0089829 A1* | 3/2021 | Rae | G06N 3/0455 |
| 2021/0201044 A1* | 7/2021 | Herdade | G06T 11/20 |
| 2021/0248460 A1* | 8/2021 | Sykora | G06N 3/08 |
| 2021/0319288 A1* | 10/2021 | Wagner | G06F 40/289 |
| 2021/0334475 A1* | 10/2021 | He | G06F 40/237 |
| 2023/0176242 A1* | 6/2023 | Xu | G01V 1/302 |
| | | | 702/14 |

OTHER PUBLICATIONS

Wang, Fei, et al. "Residual attention network for image classification." Proceedings of the IEEE conference on computer vision and pattern recognition. 2017. (Year: 2017).*
Wang, Jun, and Shengchen Li. "Self-attention mechanism based system for dcase2018 challenge task1 and task4." Proc. DCASE Challenge (2018): 1-5. (Year: 2018).*

(Continued)

*Primary Examiner* — Randall K. Baldwin
(74) *Attorney, Agent, or Firm* — DORITY & MANNING P.A.

(57) ABSTRACT

The present disclosure provides echo-attention layers, a new efficient method for increasing the expressiveness of self-attention layers without incurring significant parameter or training time costs. One intuition behind the proposed method is to learn to echo, i.e., attend once and then get N echo-ed attentions for free (or at a relatively cheap cost). As compared to stacking new layers, the proposed echoed attentions are targeted at providing similar representation power at a better cost efficiency.

20 Claims, 6 Drawing Sheets

(56) References Cited

OTHER PUBLICATIONS

Choe, Junsuk, and Hyunjung Shim. "Attention-based dropout layer for weakly supervised object localization." Proceedings of the IEEE/CVF conference on computer vision and pattern recognition. 2019. (Year: 2019).*
Bello, Irwan, et al. "Attention augmented convolutional networks." Proceedings of the IEEE/CVF international conference on computer vision. 2019. (Year: 2019).*
Lioutas, Vasileios, and Andriy Drozdyuk. "Copy this Sentence." arXiv preprint arXiv:1905.09856 (2019). (Year: 2019).*
Ma, Qianli, et al. "Convolutional multitimescale echo state network." IEEE Transactions on Cybernetics 51.3 (2019): 1613-1625. (Year: 2019).*
Ramamurthy, R., et al. "Echo State Networks for Named Entity Recognition." 2019 (Year: 2019).*
Zhang, Zhebin, et al. "Self-attention and dynamic convolution hybrid model for neural machine translation." 2020 IEEE International Conference on Knowledge Graph (ICKG). IEEE, 2020. (Year: 2020).*
Galassi, Andrea, Marco Lippi, and Paolo Torroni. "Attention in Natural Language Processing." arXiv preprint arXiv:1902.02181v3 (2020). (Year: 2020).*
Abnar, Samira, and Willem Zuidema. "Quantifying attention flow in transformers." arXiv preprint arXiv:2005.00928 (2020). (Year: 2020).*
Ma, Qianli, Lifeng Shen, and Garrison W. Cottrell. "DeePr-ESN: A deep projection-encoding echo-state network." Information Sciences 511 (Feb. 1, 2020): 152-171. (Year: 2020).*
He, Tianyu, et al. "Layer-wise coordination between encoder and decoder for neural machine translation." Advances in Neural Information Processing Systems 31 (2018). (Year: 2018).*
Bapna, Ankur, et al. "Training deeper neural machine translation models with transparent attention." arXiv preprint arXiv:1808.07561 v2 (2018). (Year: 2018).*
Choromanski, Krzysztof, et al. "Rethinking attention with performers." arXiv preprint arXiv:2009.14794 v1 (2020). (Year: 2020).*
Wang, Sinong, et al. "Linformer: Self-attention with linear complexity." arXiv preprint arXiv:2006.04768 (2020). (Year: 2020).*
Zaheer, Manzil, et al. "Big bird: Transformers for longer sequences." Advances in neural information processing systems 33 (2020): 17283-17297. (Year: 2020).*
Dosovitskiy, Alexey, et al. "An image is worth 16x16 words: Transformers for image recognition at scale." arXiv preprint arXiv:2010.11929 (2020). (Year: 2020).*
Liu, Liyuan, Jialu Liu, and Jiawei Han. "Multi-head or single-head? an empirical comparison for transformer training." arXiv preprint arXiv:2106.09650 (Jun. 2021). (Year: 2021).*
Abnar et al., "Transferring Inductive Biases Through Knowledge Distillation", arXiv preprint arXiv:2006.00555, 2020, 18 pages.
Bahdanau et al., "Neural Machine Translation by Jointly Learning to Align and Translate", arXiv preprint arXiv:1409.0473, 2014, 15 pages.
Berant et al., "Semantic Parsing on Freebase From Question-Answer Pairs", In Proceedings of the 2013 Conference on Empirical Methods in Natural Language Processing, 2013, pp. 1533-1544.
Bhattamishra et al., "On the Computational Power of Transformers and Its Implications in Sequence Modeling", arXiv preprint arXiv:2006.09286, 2020, 21 pages.
Github, "JAX: Autograd and XLA", 2018, https://github.com/google/jax, retrieved on Jul. 18, 2022, 13 pages.
Brown et al., "Language Models Are Few-Shot Learners", Advances in Neural Information Processing Systems, vol. 33, 2020, pp. 1877-1901.
Chelba et al., "One Billion Word Benchmark for Measuring Progress in Statistical Language Modeling", arXiv preprint arXiv:1312.3005, 2013, 6 pages.
Cui et al., "Attention-over-attention Neural Networks for Reading Comprehension", arXiv preprint arXiv:1607.04423, 2016, 10 pages.
Dauphin et al.,. "Language Modeling with Gated Convolutional Networks", In International Conference on Machine Learning, 2017, pp. 933-941.
Dehghani et al., "Universal Transformers", arXiv preprint arXiv:1807.03819, 2018, 23 pages.
Devlin et al., "Bert: Pre-Training of Deep Bidirectional Transformers for Language Understanding", arXiv preprint arXiv:1810.04805, 2018, 16 pages.
Dosovitskiy et al., "An Image Is Worth 16x16 Words: Transformers for Image Recognition at Scale", arXiv preprint arXiv:2010.11929, 2020, 22 pages.
Fabbri et al., "Multi-news: A Large-Scale Multi-Document Summarization Dataset and Abstractive Hierarchical Model", arXiv preprint arXiv:1906.01749, 2019, 11 pages.
Gong et al., "Ruminating Reader: Reasoning With Gated Multi-Hop Attention", arXiv preprint arXiv:1704.07415, 2017, 11 pages.
Graves et al., "Adaptive Computation Time for Recurrent Neural Networks", arXiv preprint arXiv:1603.08983, 2016, 19 pages.
Hahn et al., "Theoretical Limitations of Self-Attention in Neural Sequence Models", Transactions of the Association for Computational Linguistics, vol. 8, 2020, pp. 156-171.
GitHub, "Flax: A Neural Network Library and Ecosystem for JAX", 2020, https://github.com/google/flax, retrieved on Jul. 18, 2022, pp. 14-26.
Hu et al., "Reinforced Mnemonic Reader for Machine Reading Comprehension", arXiv preprint arXiv:1705.02798, 2017, 8 pages.
Huang et al., "Cosmos QA: Machine Reading Comprehension With Contextual Commonsense Reasoning", arXiv preprint arXiv:1909.00277, 2019, 13 pages.
Joshi, "Transformers Are Graph Neural Networks", The Gradient, 2020, 5 pages.
Joshi et al., "TriviaQA: A Large Scale Distantly Supervised Challenge Dataset for Reading Comprehension", arXiv preprint arXiv:1705.03551, 2017, 11 pages.
Kanai et al., "Sigsoftmax: Reanalysis of the Softmax Bottleneck", Advances in Neural Information Processing Systems, vol. 31, 2018, 11 pages.
Lan et al., "Albert: A Lite Bert for Self-Supervised Learning of Language Representations", arXiv preprint arXiv:1909.11942, 2019, 17 pages.
Narayan et al., "Don't Give Me the Details, Just the Summary! Topic-Aware Convolutional Neural Networks for Extreme Summarization", arXiv preprint arXiv:1808.08745, 2018, 11 pages.
Pérez et al., "On the Turing Completeness of Modern Neural Network Architectures", arXiv preprint arXiv:1901.03429, 2019, 36 pages.
Post, "A Call for Clarity in Reporting BLEU Scores", arXiv preprint arXiv:1804.08771, 2018, 6 pages.
Raffel et al., "Exploring the Limits of Transfer Learning With a Unified Text-To-Text Transformer", J. Mach. Learn. Res. 21, No. 140, 2020, 67 pages.
Rajpurkar et al., "Squad: 100,000+ Questions for Machine Comprehension of Text", arXiv preprint arXiv:1606.05250, 2016, 10 pages.
See et al., "Get to the Point: Summarization With Pointer-Generator Networks", arXiv preprint arXiv:1704.04368, 2017, 20 pages.
Shazeer et al., "Mesh-TensorFlow: Deep Learning for Supercomputers", Advances in Neural Information Processing Systems, vol. 31, 2018, pp. 10414-10423.
Shazeer et al., "Adafactor: Adaptive Learning Rates With Sublinear Memory Cost", In International Conference on Machine Learning, 2018, pp. 4596-4604.
Sukhbaatar et al., "End-To-End Memory Networks", Advances in Neural Information Processing Systems, vol. 282015, 9 pages.
Tran et al., "The Importance of Being Recurrent for Modeling Hierarchical Structure", arXiv preprint arXiv:1803.03585, 2018, 6 pages.
Vaswani et al., "Attention Is All You Need", Advances in Neural Information Processing Systems, vol. 30, 2017, pp. 5998-6008.
Wang et al., "Superglue: A Stickier Benchmark for General-Purpose Language Understanding Systems", Advances in Neural Information Processing Systems, vol. 32, 2019, 15 pages.

(56) References Cited

OTHER PUBLICATIONS

Xu et al., "Show, Attend and Tell: Neural Image Caption Generation with Visual Attention", In International Conference on Machine Learning, 2015, pp. 2048-2057.

* cited by examiner

MACHINE-LEARNED ATTENTION MODELS FEATURING ECHO-ATTENTION LAYERS

RELATED APPLICATIONS

This application claims priority to and the benefit of U.S. Provisional Patent Application No. 63/145,935, filed Feb. 4, 2021. U.S. Provisional Patent Application No. 63/145,935 is hereby incorporated by reference in its entirety.

FIELD

The present disclosure relates generally to machine learning. More particularly, the present disclosure relates to machine-learned attention models that feature one or more echo-attention layers that can perform echo-attention activations.

BACKGROUND

Various forms of machine learning models make use of attention mechanisms. Attention is a technique that mimics cognitive attention and can enhance the important parts of the input data while reducing the influence of portions of the data that are less relevant to the task at hand. As such, attention mechanisms can enable a computing system to devote more computing power to the small but important part of the data. Which part of the data is more important than others depends on the context and can in some instances be learned through training data by gradient descent.

Attention mechanisms are used in a wide variety of machine learning models, including in natural language processing and computer vision. As one example, Transformer models (Vaswani et al., Attention is all you need. *In Advances in neural information processing systems*, pp. 5998-6008, 2017) make extensive use of attention mechanisms to achieve their expressive power. Computer vision systems based on convolutional neural networks can also benefit from attention mechanisms. See, e.g., Dosovitskiy An Image is Worth 16×16 Words: Transformers for Image Recognition at Scale, arXiv:2010.11929 [cs.CV].

SUMMARY

Aspects and advantages of embodiments of the present disclosure will be set forth in part in the following description, or can be learned from the description, or can be learned through practice of the embodiments.

One example aspect of the present disclosure is directed to a computer-implemented method to perform improved and cost-efficient attention-based processing, the method includes: obtaining, by a computing system comprising one or more computing devices, one or more query elements, one or more key elements, and one or more value elements associated with a head input of a head of an echo-attention layer of a machine-learned attention model. The method includes, for an initial echo iteration: determining, by the computing system, an initial set of attention activations based at least in part on the one or more query elements and the one or more key elements. The method includes, for each of one or more additional echo iterations: determining, by the computing system, an additional set of attention activations by applying a machine-learned selection function to the one or more query elements and a previous set of attention activations determined in a previous echo iteration. The method includes generating, by the computing system, a head output for the head of the echo-attention layer based at least in part on the initial set of attention activations determined in the initial echo iteration, the one or more additional sets of attention activations determined in the one or more additional echo iterations, and the one or more value elements for the head input.

Another example aspect of the present disclosure is directed to one or more non-transitory computer-readable media that collectively store instructions that when executed by a computing system cause the computing system to operations for improved and cost-efficient attention-based processing, the operations comprising: obtaining, by the computing system, one or more query elements, one or more key elements, and one or more value elements associated with a head input of a head of an echo-attention layer of an attention model; for an initial echo iteration: determining, by the computing system, an initial set of attention activations based at least in part on the one or more query elements and the one or more key elements; for each of one or more additional echo iterations: determining, by the computing system, an additional set of attention activations by applying a selection function to the one or more query elements and a previous set of attention activations determined in a previous echo iteration, wherein the selection function comprises one or more parameters; and generating, by the computing system, a head output for the head of the echo-attention layer based at least in part on the initial set of attention activations determined in the initial echo iteration, the one or more additional sets of attention activations determined in the one or more additional echo iterations, and the one or more value elements for the head input; generating, by the computing system, a model output based at least in part on the head output; and modifying, by the computing system, one or more parameter values of the one or more parameters of the selection function based at least in part on a loss function that evaluates the model output.

Another example aspect of the present disclosure is directed to a computing system for improved and cost-efficient attention-based processing. The computing system includes one or more processors and one or more non-transitory computer-readable media that collectively store: a machine-learned attention model configured to process a model input to generate a model output, wherein the machine-learned attention model comprises one or more echo-attention layers that each comprise one or more heads, and wherein each of the one or more heads is configured to: obtain one or more query elements, one or more key elements, and one or more value elements associated with a head input for the head; for an initial echo iteration: generate an initial set of attention activations based at least in part on the one or more query elements and the one or more key elements; for each of one or more additional echo iterations: generate an additional set of attention activations by applying a machine-learned selection function to the one or more query elements and a previous set of attention activations determined in a previous echo iteration; and generate a head output based at least in part on the initial set of attention activations determined in the initial echo iteration, the one or more additional sets of attention activations determined in the one or more additional echo iterations, and the one or more value elements for the head input. The media collectively store instructions for executing the machine-learned attention model to process the model input to generate the model output.

Other aspects of the present disclosure are directed to various systems, apparatuses, methods, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
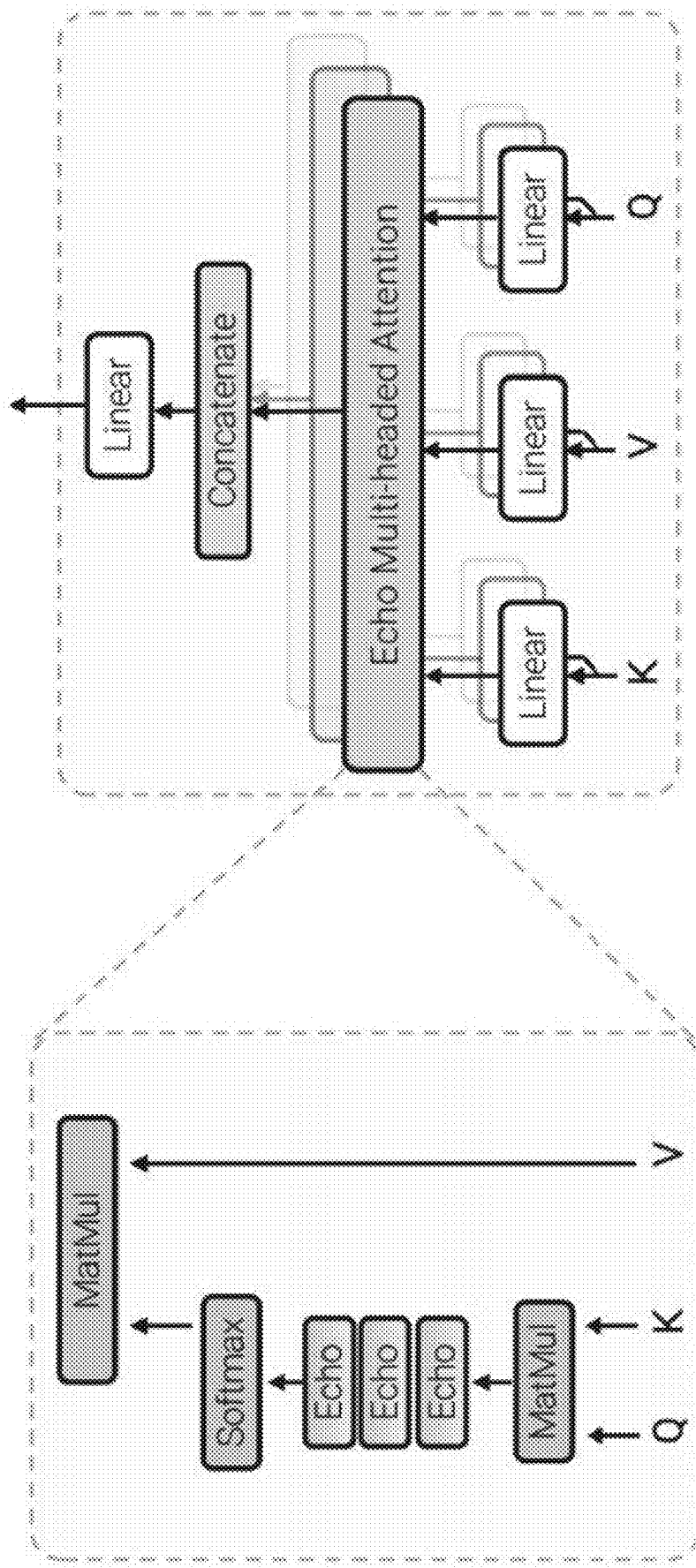
FIG. 1 provides a graphical overview of an example echo-attention mechanism according to example embodiments of the present disclosure.

Reference numerals that are repeated across plural figures are intended to identify the same features in various implementations.

DETAILED DESCRIPTION

Overview

Example aspects of the present disclosure provide echo-attention layers, a new efficient architecture and method for increasing the expressiveness of self-attention layers without incurring significant parameter or training time costs. One intuition behind the proposed method is to learn to echo, i.e., attend once and then get N echo-ed attentions for free (or at a relatively cheap cost). As compared to stacking new layers, the proposed echoed attentions are targeted at providing similar representation power at a better cost efficiency.

Extensive experiments were conducted on language modeling (LM), machine translation (MT), and large scale pretraining and finetuning. Across several diverse and challenging NLP datasets and tasks, the example experiments show that Transformers equipped with echo-attention layers (which can be referred to as "Echoformers") outperform vanilla transformers. Echoformers achieve state-of-the-art on a new challenging compositional generalization benchmark. Connections can also be drawn to self-gating activation functions, iterative attention models, mixture-of-softmax, sparse attention, gated linear units and universal transformers.

The systems and methods of the present disclosure provide a number of technical effects and benefits. As one example, the echo-attention mechanisms described herein can result in improved performance (e.g., greater accuracy) of machine-learned models at various tasks, including, for example, image processing or analysis tasks and/or natural language processing or analysis tasks such as speech recognition or speech or text translation. Thus, the proposed echo-attention mechanisms can enable an improvement in the performance of a computing system.

As another example technical effect, the echo-attention mechanisms described herein can enable machine-learned models to maintain a same level of performance while reducing the number of parameters included in the model. Reducing the number of parameters can result in improved conservation of computing resources such as processor usage, memory usage, network bandwidth, etc. For example, a model with the echo-attention mechanisms described herein may achieve the same performance as a larger model that does not have the echo-attention mechanisms described herein. Therefore, the model with the echo-attention mechanisms described herein can be stored using less memory consumption.

As another example technical effect, the systems and methods of the present disclosure can facilitate enhanced usage of attention-based networks, which are generally more efficient than typical convolutional or recurrent neural networks.

Example Vanilla Attention Mechanism

Attention mechanisms are used in a wide variety of machine learning models, including in natural language processing and computer vision. Specifically, one example form of "vanilla" self-attention is as follows: a self-attention module first projects an input tensor X to query (Q), key (K), and values (V). Namely, for each head h and each layer $\ell$, this can be written as:

$$Q_{h,\ell} = W_{q,h,\ell} X,$$

$$K_{h,\ell} = W_{k,h,\ell} X,$$

$$V_{h,\ell} = W_{v,h,\ell} X,$$

where $W_{q,h,\ell}$, $W_{k,h,\ell}$, $W_{v,h,\ell}$ are learned parameters.

In some examples of vanilla scaled dot-product self-attention, for layer $\ell$ and head h, this can be also written as:

$$Y_{h,\ell,i} = \sum_{j=0}^{N} a_{i,j,h,\ell} \cdot V_{j,h,\ell}$$

$$\text{where } A_{h,\ell} = \text{softmax}\left(\frac{Q_{h,\ell} K_{h,\ell}^T}{\sqrt{d_k}}\right).$$

$A_{h,\ell}$ acts as a form of routing matrix that guides the routing of representations at layer $\ell$. The output at each layer $\ell$ can be defined as $o_\ell = W_o \text{concat}(Y_{1,\ell} \ldots Y_{H,\ell}) + b_o$. A layer normalization and residual connector to the previous layer can be wrapped around this module, followed by a two-layer positional-wise feed-forward network with ReLU activations.

Example Echo-Attention Mechanisms

FIG. 1 provides a graphical overview of the proposed echo-attention mechanism. One key aspect of the echo-attention mechanism is to learn to echo. In particular, the echo-attention mechanism can reuse the logits $A_{h,\ell}$ and construct an interpolation (or mixture) of echoed activations as the final output.

The echo-attention layer similarly acts upon query, keys, and values, which in some implementations are first learned via linear transformations. Echoed attention activations are lightweight echoes of the original attention activations that can be constructed in a sequential fashion.

There are two design principles and motivators for echo-attention:

First, at each step, the model learns what to echo. Activations that are selected in step k are already activated and have lesser presence in subsequent echoes. In short, echoes are sequentially activated with $E_{0,h,\ell} = A_{h,\ell}$.

Second, the echo-attention is stateful, i.e., echoes in step k are distinct from other steps. Some example implementations use a state function $U(\bullet)$ to distinguish between echoes at each step. The model learns to control the activation strength across echoes. Generally, for a single head h and layer $\ell$, the overall echo-attention can be defined as:

$$Y_{h,\ell} = \mathrm{softmax}(E_{0,h,\ell} + E_{1,h,\ell} + \ldots E_{S,h,\ell}) V_{h,\ell}$$

where the final S is the number of echo steps and $E_{0,h,\ell}$ is the initial activations defined as $Q_{h,\ell} K_{h,\ell}^T$.

The function defining $E_{k+1,h,\ell}$ can be defined as: $E_{k+1,h,\ell} = \mathrm{select}_{h,\ell}(E_{k,h}, Q_{h,\ell})$. Thus, the $E_{k+1,h,\ell}$ echo can be conditioned and produced from $E_{k,h,\ell}$. For example, $\mathrm{select}_{h,\ell}(\bullet)$ can be a parameterized function that accepts the previous $E_{k,h,\ell}$ and query tensor as an input. The function $\mathrm{select}_{h,\ell}(\bullet)$ can be responsible for (1) learning what to echo and (2) producing the echo activations for step k.

Specifically, in each step, the model learns what to echo. In some instances, when activations are echo-ed, they are softly erased (gated) from the matrix and have a lesser presence in the next echo step. The echo-ed attention can be seen as selectively choosing activations to activate (echo) across multiple steps and acts as a form of gating mechanism.

Given $E_{k-1,h,\ell}$ for the (k−1)-th echo step for head h and layer $\ell$, the model can first learn a priority score for each activation that denotes an activation's involvement in the current echo. This can be done for each activation, or across row/column dimensions. For simplicity, some example implementations can tie the priority scores at the input-component-level (e.g., token-level) so all $P_{i,*}$ have the same values for all values of j. To learn the associated priority scores of the ij-th logit at the n-th priority layer, some example implementations can adopt a simple linear projection to a scalar value:

$$P_{k,ij,h,\ell} = \mathrm{sigmoid}(W_{k,h,\ell} Q_{k,i,h,\ell})$$

Intuitively, $P_{k,ij,h,\ell}$ can in some instances be interpreted as a form of gating mechanism that learns to reweight the attention matrix. Given the priority matrix, the echo-ed logits at step k can in some implementations be defined as:

$$E_{k,h,\ell} = P_{k,h,\ell} \odot \hat{E}_{k-1,h,\ell}$$

where $\hat{E}_{k-1}$ is the activation matrix passed to the next echo step after taking into consideration the decision made at step k. In some implementations, this can be expressed as:

$$\hat{E}_{k-1,h,\ell} = U_{k,h,\ell}((1 - P_{k-1,h,\ell}) \odot E_{k-1,h,\ell}))$$

where U maps from $\mathbb{R}^{N \times N} \to \mathbb{R}^{N \times N}$ is a parameterized function that maps an N×N matrix to another N×N matrix. $F_T$ is the state function that is used to denote a transition from step k to step k+1.

One example choice of function $U(\bullet)$ is a simple learned scaling of its input. The model has the flexibility to learn to control this knob in which the activations can either become stronger or weaker. This can in some instances be interpreted as a form of temperature. This can be denoted by:

$$U_{k,h,\ell}(X) = \alpha_{k,h,\ell} X$$

Various different choices can be made here, including where $\alpha \in \mathbb{R}$ is a scalar parameter that is used to scale the matrix X up or down. Another option that can be used is row or column wise position-based scaling where $\alpha_{k,h,\ell} \in \mathbb{R}^N$ is a vector and is either broadcast in a row or column fashion. In short, with $U(\bullet)$, the model learns to assign a specific magnitude (whether large or small) with each echo. The model has the flexibility to anneal the activation strength, or learn to increase it over echoes.

Example Methods

Figure 2:
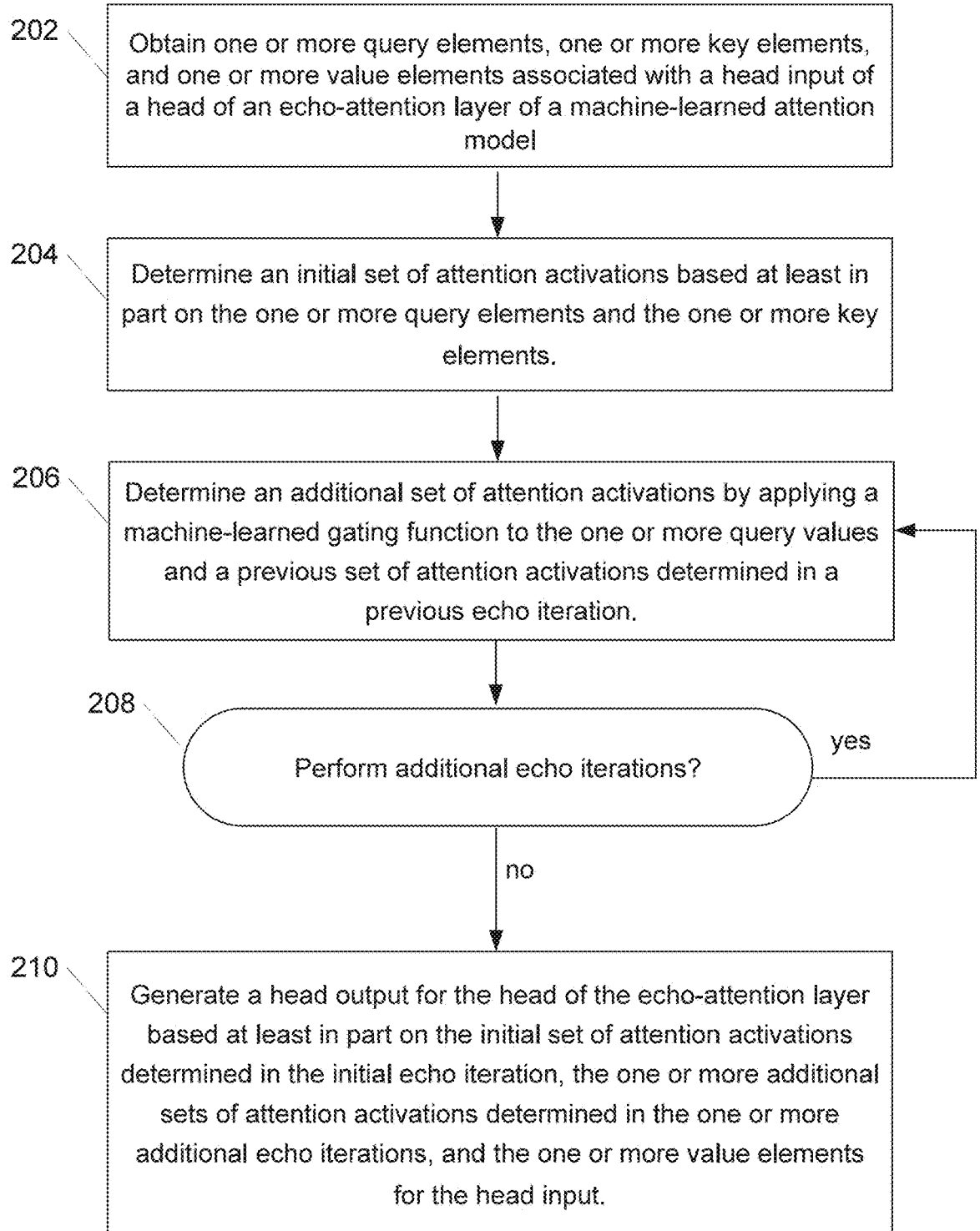
FIG. 2 depicts a flow chart diagram of an example method to perform echo-attention according to example embodiments of the present disclosure.

FIG. 2 depicts a flow chart diagram of an example method 200 to perform echo-attention according to example embodiments of the present disclosure. FIG. 2 can be performed for each head in an echo-attention layer. If the echo-attention layer contains multiple heads, method 200 can be performed in parallel for each head.

At 202, the method includes obtaining, by a computing system comprising one or more computing devices, one or more query elements, one or more key elements, and one or more value elements associated with a head input of the head of the echo-attention layer of the machine-learned attention model.

As one example, a self-attention module can first project an input tensor X to query (Q), key (K), and values (V). Namely, for each head h and each layer $\ell$, this can be written as:

$$Q_{h,\ell} = W_{q,h,\ell} X,$$

$$K_{h,\ell} = W_{k,h,\ell} X,$$

$$V_{h,\ell} = W_{v,h,\ell} X,$$

where $W_{q,h,\ell}$, $W_{k,h,\ell}$, $W_{v,h,\ell}$ are learned parameters.

At 204, the method includes determining, by the computing system, an initial set of attention activations based at least in part on the one or more query elements and the one or more key elements.

As one example, the initial set of attention activations can be expressed as:

$$E_{0,h,\ell} = Q_{h,\ell} K_{h,\ell}^T$$

At 206, the method includes determining, by the computing system, an additional set of attention activations by applying a machine-learned selection function to the one or more query elements and a previous set of attention activations determined in a previous echo iteration.

Thus, as one example, the additional set of attention activations $E_{k+1,h,\ell}$ can be defined as:

$$E_{k+1,h,\ell} = \mathrm{select}_{h,\ell}(E_{k,h}, Q_{h,\ell})$$

where $\mathrm{select}_{h,\ell}(\bullet)$ is a parameterized function that accepts the previous $E_{k,h,\ell}$ and query tensor as an input.

Figure 3:
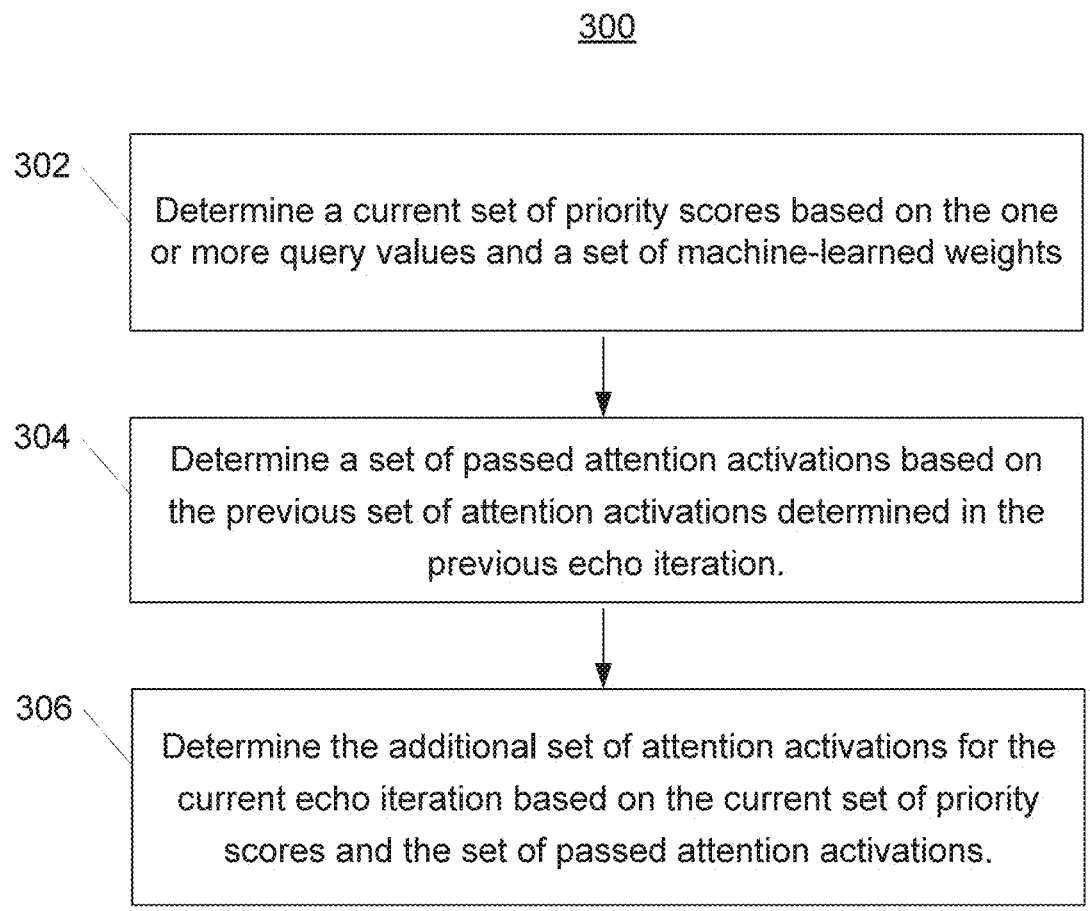
FIG. 3 depicts a flow chart diagram of an example method to perform echo-attention according to example embodiments of the present disclosure.

To provide one example, FIG. 3 provides a flow chart diagram of an example method 300 to apply the machine-learned selection function to the one or more query elements and the previous set of attention activations to determine an additional set of attention activations.

At 302, the method includes determining, by a computing system, a current set of priority scores based on the one or more query elements and a set of machine-learned weights.

As one example, determining, by the computing system, the current set of priority scores based on the one or more query elements and the set of machine-learned weights can include applying, by the computing system, a sigmoid function to the set of machine-learned weights multiplied by the one or more query elements.

As one example, in some implementations, this can be expressed as:

$$P_{k,i,j,h,\ell} = \text{sigmoid}(W_{k,h,\ell} Q_{k,i,h,\ell})$$

where $W_{k,h,\ell}$ are a set of machine-learned weights.

At 304, the method includes determining, by the computing system, a set of passed attention activations based on the previous set of attention activations determined in the previous echo iteration.

In some implementations, determining, by the computing system, the set of passed attention activations based on the previous set of attention activations can include: obtaining, by the computing system, a previous set of priority scores from the previous echo iteration; applying, by the computing system, a machine-learned state function to the previous set of priority scores to obtain a set of passed scores; and determining, by the computing system, the set of passed attention activations as a dot product of the set of passed scores and the previous set of attention activations.

As one example, in some implementations, this can be expressed as:

$$\hat{E}_{k-1,h,\ell} = U_{k,h,\ell}((1 - P_{k-1,h,\ell}) \odot E_{k-1,h,\ell}))$$

where U maps from $\mathbb{R}^{N \times N} \to \mathbb{R}^{N \times N}$ is a parameterized function that maps an N×N matrix to another N×N matrix. $F_T$ is the state function that is used to denote a transition from step k to step k+1.

In some implementations, the machine-learned state function comprises a scaling function that applies one or more machine-learned scaling values. For example, in some implementations, this can be expressed as:

$$U_{k,h,\ell}(X) = \alpha_{k,h,\ell} X$$

At 306, the method includes determining, by the computing system, the additional set of attention activations for the current echo iteration based on the current set of priority scores and the set of passed attention activations.

As one example, in some implementations, this can be expressed as:

$$E_{k,h,\ell} = P_{k,h,\ell} \odot \hat{E}_{k-1,h,\ell}$$

Referring again to FIG. 2, at 208, the method includes determining whether to perform additional echo iterations. For example, an iteration counter can be compared to a user-defined desired number of iteration to determine whether to perform additional echo iterations. If it is determined at 208 that an additional echo iteration should be performed, then method 200 can return to 206. However, if it is determined at 208 that an additional echo iteration should not be performed, then method 200 can proceed to 210.

At 210, the method includes generating, by the computing system, a head output for the head of the echo-attention layer based at least in part on the initial set of attention activations determined in the initial echo iteration, the one or more additional sets of attention activations determined in the one or more additional echo iterations, and the one or more value elements for the head input.

In some implementations, generating, by the computing system, the head output for the head of the echo-attention layer can include summing, by the computing system, the initial set of attention activations and the one or more additional sets of attention activations to generate a summed set of attention activations; applying, by the computing system, a softmax operation to the summed set of attention activations to generate a normalized set of attention activations; and multiplying, by the computing system, the normalized set of attention activations with the one or more value elements for the head input to generate the head output.

As one example, in some implementations, the head output $Y_{h,\ell}$ can be expressed as:

$$Y_{h,\ell} = \text{softmax}(E_{0,h,\ell} + E_{1,h,\ell} + \ldots E_{S,h,\ell}) V_{h,\ell}$$

After performance of method 200 for each head, the computing system can generate a layer output based on the head output generated for each head. As one example, in some implementations, the output at each layer $\ell$ can be defined as:

$$O_\ell = W_o \text{concat}(Y_{1,\ell} \ldots Y_{H,\ell}) + b_o$$

In some implementations, A layer normalization and residual connector to the previous layer can be wrapped around the layer, followed optionally by a two-layer positional-wise feed-forward network with ReLU activations.

Any of the machine-learned parameters described above, including, for example, the set of weights applied by the priority scoring function and/or the scaling value(s) included in the state function can be learned jointly with the standard model parameters. For example, a loss function can evaluate the model output (e.g., relative to some ground truth). The loss function can be backpropagated through the model to update the parameter values of the model (e.g., including the model parameters included in the echo-attention mechanism).

Example Computing Systems

Figure 4A:
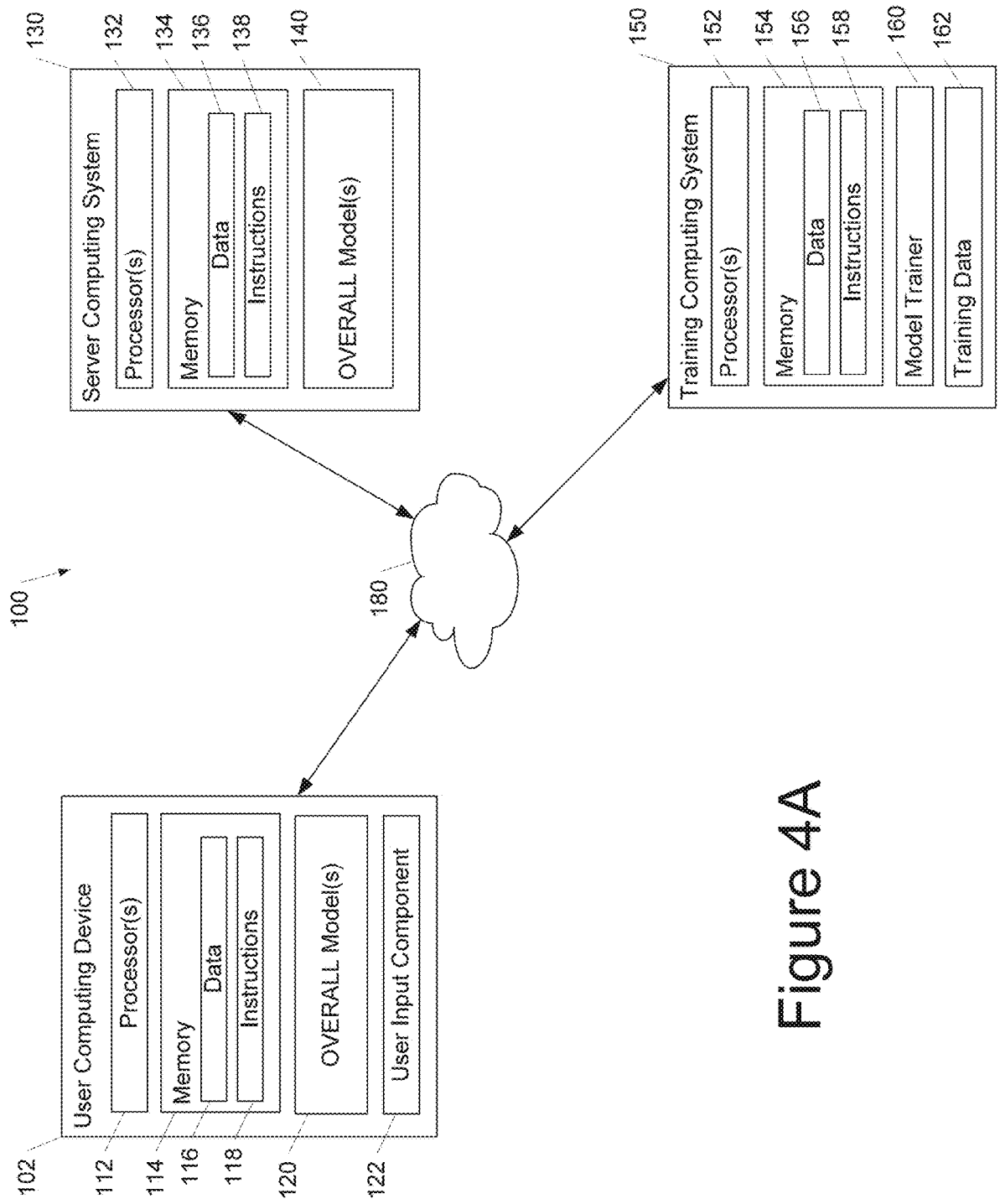
FIG. 4A depicts a block diagram of an example computing system according to example embodiments of the present disclosure.

FIG. 4A depicts a block diagram of an example computing system 100 that according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, an FPGA, a controller, a microcontroller, etc.) and can be one processor or a plurality of processors that are operatively connected. The memory 114 can include one or more non-transitory computer-readable storage media, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Some example machine-learned models can leverage an attention mechanism such as self-attention. For example, some example machine-learned models can include multi-headed self-attention models (e.g., transformer models).

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120.

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service. Thus, one or more models 120 can be stored and implemented at the user computing device 102 and/or one or more models 140 can be stored and implemented at the server computing system 130.

The user computing device 102 can also include one or more user input components 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, an FPGA, a controller, a microcontroller, etc.) and can be one processor or a plurality of processors that are operatively connected. The memory 134 can include one or more non-transitory computer-readable storage media, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Some example machine-learned models can leverage an attention mechanism such as self-attention. For example, some example machine-learned models can include multi-headed self-attention models (e.g., transformer models).

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, an FPGA, a controller, a microcontroller, etc.) and can be one processor or a plurality of processors that are operatively connected. The memory 154 can include one or more non-transitory computer-readable storage media, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 162. In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM, hard disk, or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be latent encoding data (e.g., a latent space representation of an input, etc.). The machine-learned model(s) can process the latent encoding data to generate an output. As an example, the machine-learned model(s) can process the latent encoding data to generate a recognition output. As another example, the machine-learned model(s) can process the latent encoding data to generate a reconstruction output. As another example, the machine-learned model(s) can process the latent encoding data to generate a search output. As another example, the machine-learned model(s) can process the latent encoding data to generate a reclustering output. As another example, the machine-learned model(s) can process the latent encoding data to generate a prediction output.

In some implementations, the input to the machine-learned model(s) of the present disclosure can be statistical data. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the machine-learned model(s) can be configured to perform a task that includes encoding input data for reliable and/or efficient transmission or storage (and/or corresponding decoding). For example, the task may be an audio compression task. The input may include audio data and the output may comprise compressed audio data. In another example, the input includes visual data (e.g. one or more image or videos), the output comprises compressed visual data, and the task is a visual data compression task. In another example, the task may comprise generating an embedding for input data (e.g. input audio or visual data).

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

In some cases, the input includes audio data representing a spoken utterance and the task is a speech recognition task. The output may comprise a text output which is mapped to the spoken utterance. In some cases, the task comprises encrypting or decrypting input data. In some cases, the task comprises a microprocessor performance task, such as branch prediction or memory address translation.

FIG. 4A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 4B:
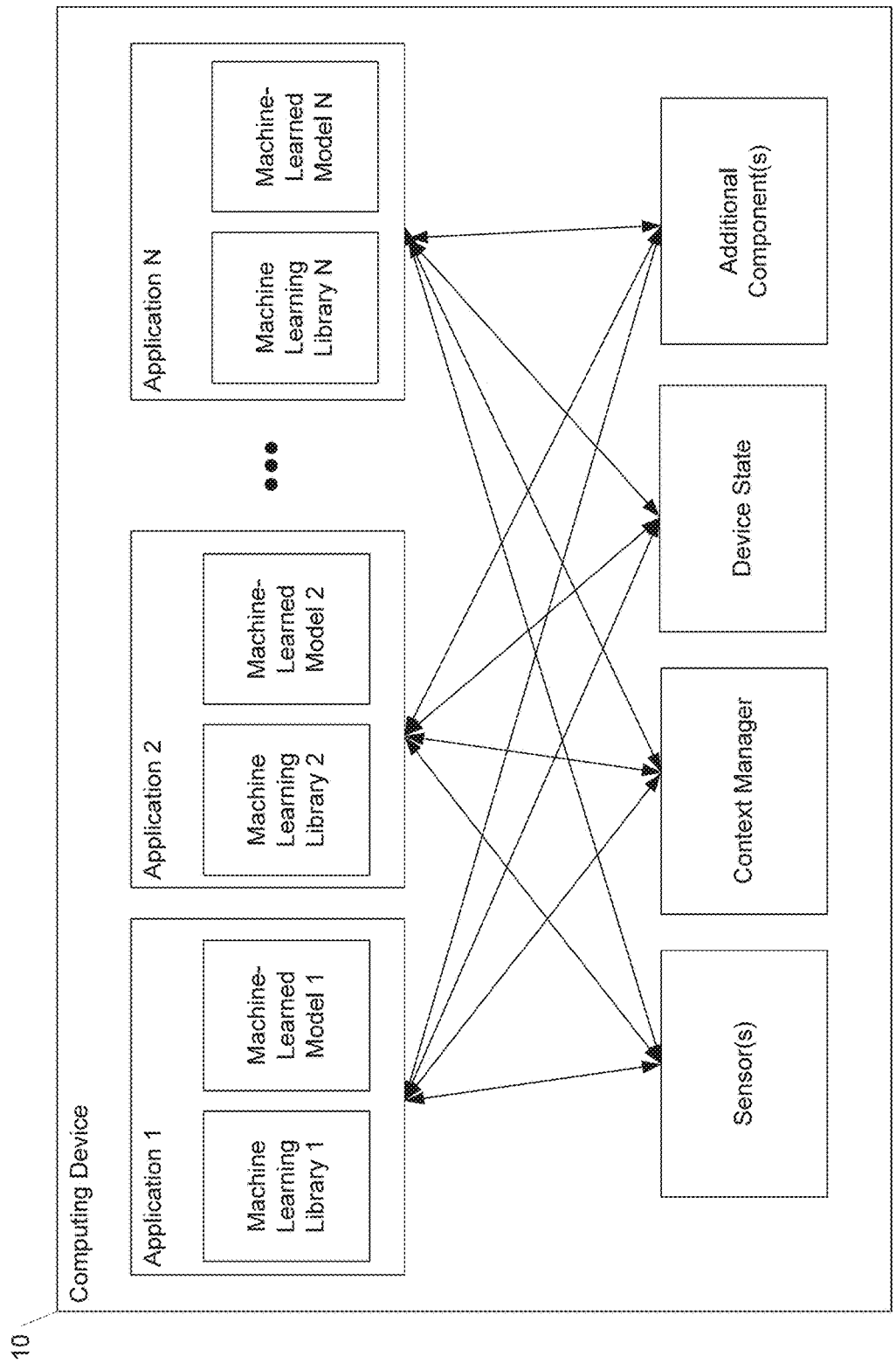
FIG. 4B depicts a block diagram of an example computing device according to example embodiments of the present disclosure.

FIG. 4B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 4B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 4C:
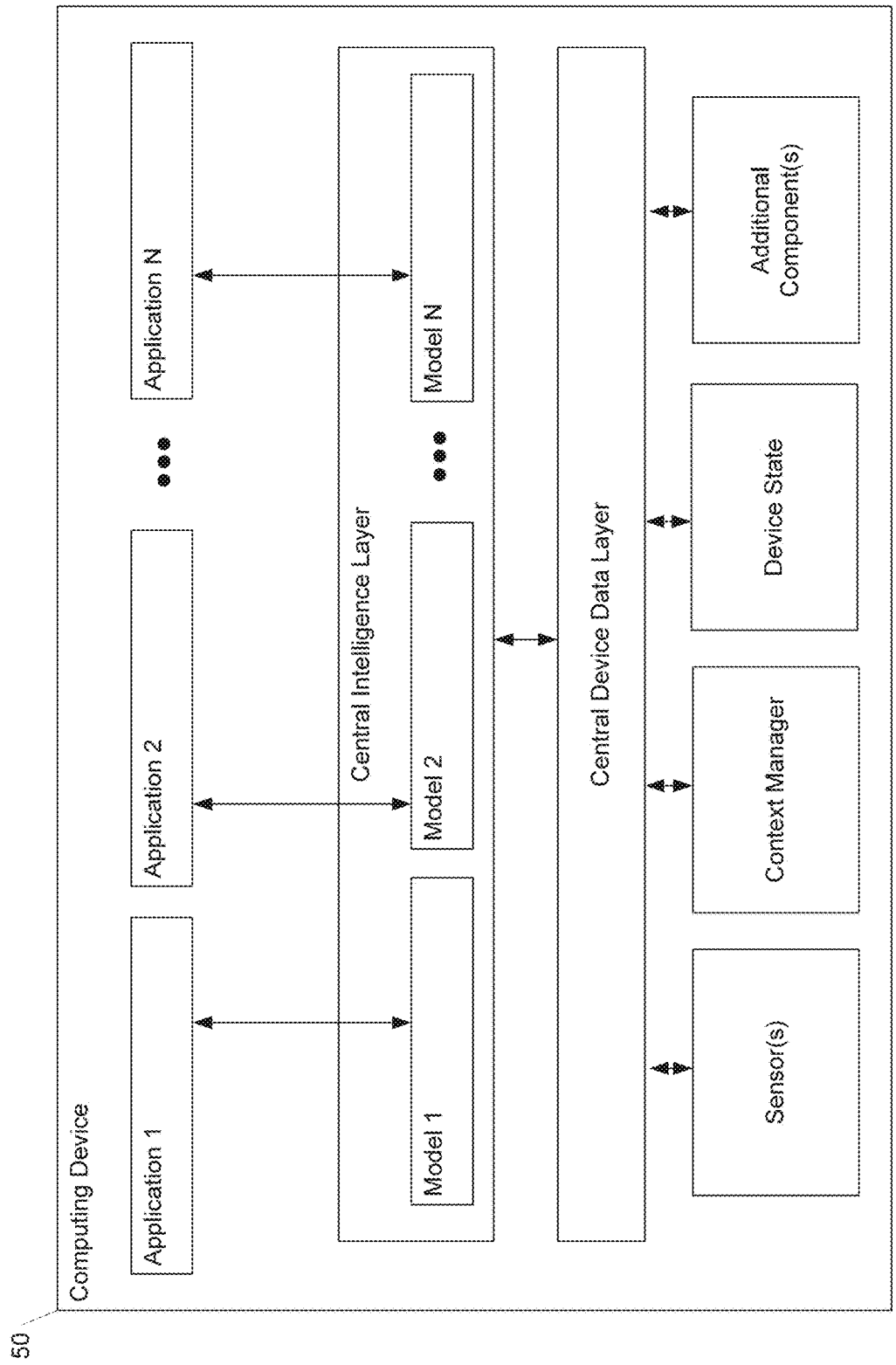
FIG. 4C depicts a block diagram of an example computing device according to example embodiments of the present disclosure.

FIG. 4C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 4C, a respective machine-learned model can be provided for each application and managed by the central intelligence layer. In other implementations, two or more applications can share a single machine-learned model. For example, in some implementations, the central intelligence layer can provide a single model for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 4C, the central device data layer can communicate with a number of other components of the computing device, such as, for example, one or more sensors, a context manager, a device state component, and/or additional components. In some implementations, the central device data layer can communicate with each device component using an API (e.g., a private API).

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method comprising:
    obtaining, by a computing system comprising one or more computing devices, one or more query elements, one or more key elements, and one or more value elements associated with a head input of a head of an echo-attention layer of a machine-learned attention model;
    for an initial echo iteration:
        determining, by the computing system, an initial set of attention activations based at least in part on the one or more query elements and the one or more key elements;
    for each respective echo iteration of one or more additional echo iterations:
        determining, by the computing system, an additional set of attention activations for the respective echo iteration by applying a machine-learned selection function to the one or more query elements and a previous set of attention activations determined in a previous echo iteration;
    generating, by the computing system, a head output for the head of the echo-attention layer based at least in part on the initial set of attention activations determined in the initial echo iteration, the one or more additional sets of attention activations determined in the one or more additional echo iterations, and the one or more value elements for the head input; and
    generating, by the computing system, a model output of the machine-learned attention model based at least in part on the head output for the head of the echo-attention layer, wherein the model output comprises a task-specific prediction for a task.

2. The computer-implemented method of claim 1, wherein applying the machine-learned selection function to the one or more query elements and the previous set of attention activations determined in the previous echo iteration comprises:
    determining, by the computing system, a current set of priority scores based on the one or more query elements and a set of machine-learned weights;
    determining, by the computing system, a set of passed attention activations based on the previous set of attention activations determined in the previous echo iteration; and
    determining, by the computing system, the additional set of attention activations for the respective echo iteration based on the current set of priority scores and the set of passed attention activations.

3. The computer-implemented method of claim 2, wherein determining, by the computing system, the current set of priority scores based on the one or more query elements and the set of machine-learned weights comprises applying, by the computing system, a sigmoid function to the set of machine-learned weights multiplied by the one or more query elements.

4. The computer-implemented method of claim 2, wherein determining, by the computing system, the set of passed attention activations based on the previous set of attention activations comprises:
    obtaining, by the computing system, a previous set of priority scores from the previous echo iteration;
    applying, by the computing system, a machine-learned state function to the previous set of priority scores to obtain a set of passed scores; and
    determining, by the computing system, the set of passed attention activations as a dot product of the set of passed scores and the previous set of attention activations.

5. The computer-implemented method of claim 4, wherein the machine-learned state function comprises a scaling function that applies one or more machine-learned scaling values.

6. The computer-implemented method of claim 1, wherein generating, by the computing system, the head output for the head of the echo-attention layer comprises:
    summing, by the computing system, the initial set of attention activations and the one or more additional sets of attention activations to generate a summed set of attention activations;
    applying, by the computing system, a softmax operation to the summed set of attention activations to generate a normalized set of attention activations; and
    multiplying, by the computing system, the normalized set of attention activations with the one or more value elements for the head input to generate the head output.

7. The computer-implemented method of claim 1, wherein:
    the echo-attention layer comprises a plurality of heads;
    the method comprises performing, by the computing system, the method of claim 1 for each respective head to generate a plurality of head outputs respectively for the plurality of heads; and
    the method further comprises generating, by the computing system, a layer output for the echo-attention layer from the plurality of head outputs of the plurality of heads.

8. The computer-implemented method of claim 1, wherein the machine-learned attention model comprises a natural language processing model configured to process a natural language input.

9. The computer-implemented method of claim 1, wherein the machine-learned attention model comprises an image processing model configured to process an input image.

10. One or more non-transitory computer-readable media that collectively store instructions that when executed by a computing system cause the computing system to perform operations, the operations comprising:
    obtaining, by the computing system, one or more query elements, one or more key elements, and one or more value elements associated with a head input of a head of an echo-attention layer of an attention model;
    for an initial echo iteration:
        determining, by the computing system, an initial set of attention activations based at least in part on the one or more query elements and the one or more key elements;
    for each respective echo iteration of one or more additional echo iterations:
        determining, by the computing system, an additional set of attention activations for the respective echo iteration by applying a selection function to the one or more query elements and a previous set of attention activations determined in a previous echo iteration, wherein the selection function comprises one or more parameters;
    generating, by the computing system, a head output for the head of the echo-attention layer based at least in part on the initial set of attention activations determined in the initial echo iteration, the one or more additional sets of attention activations determined in the one or more additional echo iterations, and the one or more value elements for the head input;

generating, by the computing system, a model output based at least in part on the head output; and modifying, by the computing system, one or more parameter values of the one or more parameters of the selection function based at least in part on a loss function that evaluates the model output.

11. The one or more non-transitory computer-readable media of claim 10, wherein:

applying the selection function to the one or more query elements and the previous set of attention activations determined in the previous echo iteration comprises:

determining, by the computing system, a current set of priority scores based on the one or more query elements and a set of weights;

determining, by the computing system, a set of passed attention activations based on the previous set of attention activations determined in the previous echo iteration;

determining, by the computing system, the additional set of attention activations for the respective echo iteration based on the current set of priority scores and the set of passed attention activations; and modifying, by the computing system, the one or more parameter values of the one or more parameters of the selection function comprises modifying, by the computing system, one or more of the set of weights.

12. The one or more non-transitory computer-readable media of claim 11, wherein determining, by the computing system, the current set of priority scores based on the one or more query elements and the set of machine-learned weights comprises applying, by the computing system, a sigmoid function to the set of weights multiplied by the one or more query elements.

13. The one or more non-transitory computer-readable media of claim 11, wherein:

determining, by the computing system, the set of passed attention activations based on the previous set of attention activations comprises:

obtaining, by the computing system, a previous set of priority scores from the previous echo iteration;

applying, by the computing system, a state function to the previous set of priority scores to obtain a set of passed scores, wherein the state function comprises at least some of the one or more parameters; and determining, by the computing system, the set of passed attention activations as a dot product of the set of passed scores and the previous set of attention activations; and modifying, by the computing system, the one or more parameter values of the one or more parameters of the selection function comprises modifying, by the computing system, the one or more parameters of the state function.

14. The one or more non-transitory computer-readable media of claim 13, wherein the state function comprises a scaling function that applies one or more scaling values, and wherein modifying, by the computing system, the one or more parameters of the state function comprises modifying, by the computing system, the one or more scaling values.

15. The one or more non-transitory computer-readable media of claim 10, wherein the attention model comprises a natural language processing model configured to process a natural language input.

16. The one or more non-transitory computer-readable media of claim 10, wherein the attention model comprises an image processing model configured to process an input image.

17. A computing system comprising:

one or more processors; and one or more non-transitory computer-readable media that collectively store:

a machine-learned attention model configured to process a model input to generate a model output, wherein the machine-learned attention model comprises one or more echo-attention layers that each comprise one or more heads, and wherein each of the one or more heads is configured to:

obtain one or more query elements, one or more key elements, and one or more value elements associated with a head input for the head;

for an initial echo iteration:

generate an initial set of attention activations based at least in part on the one or more query elements and the one or more key elements;

for each respective echo iteration of one or more additional echo iterations:

generate an additional set of attention activations for the respective echo iteration by applying a machine-learned selection function to the one or more query elements and a previous set of attention activations determined in a previous echo iteration; and generate a head output based at least in part on the initial set of attention activations determined in the initial echo iteration, the one or more additional sets of attention activations determined in the one or more additional echo iterations, and the one or more value elements for the head input; and instructions for executing the machine-learned attention model to process the model input to generate the model output.

18. The computing system of claim 17, wherein the machine-learned selection function comprises a machine-learned priority scoring function and a machine-learned state function.

19. The computing system of claim 17, wherein the machine-learned attention model comprises a natural language processing model configured to process a natural language input.

20. The computing system of claim 17, wherein the machine-learned attention model comprises an image processing model configured to process an input image.

* * * * *